United States Patent
Hong et al.

(10) Patent No.: US 10,296,149 B2
(45) Date of Patent: May 21, 2019

(54) TOUCH SENSOR CONFIGURED TO DETECT TOUCH PRESSURE AND DISPLAY DEVICE INCLUDING THE SAME

(71) Applicant: SAMSUNG DISPLAY CO., LTD., Yongin-si, Gyeonggi-do (KR)

(72) Inventors: Won Ki Hong, Yongin-si (KR); Jong In Baek, Yongin-si (KR); Eun Jin Sung, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 41 days.

(21) Appl. No.: 15/610,383

(22) Filed: May 31, 2017

(65) Prior Publication Data
US 2018/0107325 A1 Apr. 19, 2018

(30) Foreign Application Priority Data

Oct. 17, 2016 (KR) .......................... 10-2016-0134538

(51) Int. Cl.
G06F 3/044 (2006.01)
(52) U.S. Cl.
CPC ...... G06F 3/044 (2013.01); *G06F 2203/04107* (2013.01); *G06F 2203/04112* (2013.01)
(58) Field of Classification Search
CPC ......... G06F 3/041; G06F 3/0414; G06F 3/044
See application file for complete search history.

(56) References Cited

U.S. PATENT DOCUMENTS

| 3,974,332 A | * | 8/1976 | Abe ..................... G06F 3/044 178/18.08 |
| 4,526,043 A | * | 7/1985 | Boie ..................... G01B 7/004 361/283.3 |
| 5,218,173 A | * | 6/1993 | Garwin ................. G06F 3/046 178/18.08 |
| 5,475,306 A | * | 12/1995 | Ludeke ............. G01R 33/0354 324/248 |
| 7,511,702 B2 | | 3/2009 | Hotelling |
| 7,538,760 B2 | | 5/2009 | Hotelling et al. |

(Continued)

FOREIGN PATENT DOCUMENTS

KR 10-2014-0024237 2/2014
KR 10-1626766 6/2016

*Primary Examiner* — Kent W Chang
*Assistant Examiner* — Nathaniel P Brittingham
(74) *Attorney, Agent, or Firm* — F. Chau & Associates, LLC

(57) ABSTRACT

A display device includes a display panel, a touch sensor, and a conductive layer. The touch sensor is disposed on the display panel, and is configured to detect a pressure of a touch and calculate a position and an intensity of the touch. The conductive layer is disposed on the touch sensor. The touch sensor includes a plurality of first electrodes, a plurality of second electrodes spaced apart from the plurality of first electrodes, and a plurality of elastic members disposed between the plurality of first electrodes and the plurality of second electrodes. The display device is configured to calculate a variation a of capacitance between the plurality of first electrodes and the plurality of second electrodes that is caused by a transformation of the elastic member in response to the pressure of the touch.

19 Claims, 7 Drawing Sheets

(56) References Cited

U.S. PATENT DOCUMENTS

| | | | |
|---|---|---|---|
| 8,599,165 B2* | 12/2013 | Westhues | G06F 3/0412 345/174 |
| 8,654,524 B2 | 2/2014 | Pance et al. | |
| 8,686,952 B2 | 4/2014 | Burrough et al. | |
| 8,787,006 B2 | 7/2014 | Golko et al. | |
| 9,507,456 B2 | 11/2016 | Watazu et al. | |
| 2002/0182393 A1* | 12/2002 | Chu | G02B 1/116 428/216 |
| 2003/0010544 A1* | 1/2003 | Chao | G06F 3/047 178/18.01 |
| 2012/0062511 A1* | 3/2012 | Ishizaki | G06F 3/0412 345/174 |
| 2013/0257784 A1* | 10/2013 | Vandermeijden | G06F 3/044 345/174 |
| 2014/0028575 A1 | 1/2014 | Parivar et al. | |
| 2014/0085213 A1 | 3/2014 | Huppi et al. | |
| 2014/0091857 A1 | 4/2014 | Bernstein | |
| 2014/0092064 A1 | 4/2014 | Bernstein et al. | |
| 2014/0109698 A1 | 4/2014 | Lussey et al. | |
| 2014/0152613 A1* | 6/2014 | Ishizaki | G06F 3/0412 345/174 |
| 2014/0293145 A1 | 10/2014 | Jones et al. | |
| 2014/0362505 A1* | 12/2014 | Jang | H05K 9/0075 361/679.4 |
| 2015/0097805 A1* | 4/2015 | Mine | G06F 3/044 345/174 |
| 2015/0268802 A1* | 9/2015 | Kim | G06F 3/0482 715/763 |
| 2015/0370373 A1* | 12/2015 | Barel | G06F 3/047 345/174 |
| 2016/0034089 A1* | 2/2016 | Kano | G06F 3/044 345/173 |
| 2016/0048251 A1* | 2/2016 | Chang | G06F 3/0412 345/174 |
| 2016/0062504 A1* | 3/2016 | Hwang | G06F 3/0412 345/174 |
| 2016/0106012 A1* | 4/2016 | Jang | H05K 9/0086 361/679.26 |
| 2016/0147341 A1* | 5/2016 | Kim | G06F 1/1643 345/174 |
| 2016/0283031 A1* | 9/2016 | Hwang | G06F 3/0412 |
| 2016/0349887 A1* | 12/2016 | Wang | G06F 3/0412 |
| 2017/0024038 A1* | 1/2017 | Noguchi | G06F 3/044 |
| 2017/0060340 A1* | 3/2017 | Chen | G06F 3/0412 |
| 2017/0300166 A1* | 10/2017 | Rosenberg | G06F 3/045 |
| 2018/0081478 A1* | 3/2018 | Hong | G06F 3/0414 |
| 2018/0088722 A1* | 3/2018 | Kim | G02F 1/13338 |
| 2018/0095318 A1* | 4/2018 | Pyo | G06F 3/044 |
| 2018/0095582 A1* | 4/2018 | Hwang | G06F 3/0412 |
| 2018/0107325 A1* | 4/2018 | Hong | G06F 3/044 |
| 2018/0150153 A1* | 5/2018 | Yoon | G06F 3/041 |
| 2018/0203534 A1* | 7/2018 | Hong | G06F 3/041 |

* cited by examiner

TOUCH SENSOR CONFIGURED TO DETECT TOUCH PRESSURE AND DISPLAY DEVICE INCLUDING THE SAME

CROSS REFERENCE TO RELATED APPLICATION

This application claims priority to and the benefit of Korean Patent Application No. 10-2016-0134538, filed on Oct. 17, 2016, in the Korean Intellectual Property Office, the entire contents of which are herein incorporated by reference in their entirety.

TECHNICAL FIELD

The present disclosure relates to a touch sensor, and more particularly, to a touch sensor and a display device including the same.

DISCUSSION OF THE RELATED ART

Modern electronics frequently include a display device. There are many forms of display devices presently being manufactured and developed. Many display devices include a touch sensor for receiving a touch of a user while the display device displays an image. Display devices that incorporate touch sensors may be referred to as touchscreens, and the use of touchscreens may render electronic devices more convenient to use.

In addition to being able to register a location of a simple touch, many touchscreens provide pressure sensitivity for accurately gauging a particular pressure being applied to.

SUMMARY OF THE INVENTION

A display device includes a display panel, a touch sensor, and a conductive layer. The touch sensor is disposed on the display panel, and is configured to detect a pressure of a touch and calculate a position and an intensity of the touch. The conductive layer is disposed on the touch sensor. The touch sensor includes a plurality of first electrodes, a plurality of second electrodes spaced apart from the plurality of first electrodes, and a plurality of elastic members disposed between the plurality of first electrodes and the plurality of second electrodes. The display device is configured to calculate a variation a of capacitance between the plurality of first electrodes and the plurality of second electrodes that is caused by a transformation of the elastic member in response to the pressure of the touch.

A touch sensor includes a plurality of first electrodes, a plurality of second electrodes spaced apart from the plurality of first electrodes, a plurality of elastic members disposed between the plurality of first electrodes and the plurality of second electrodes, the plurality of elastic members being configured to deform in response to a pressure of a touch, and a plurality of conductive layers disposed on the plurality of first electrodes. The touch sensor is configured to obtain detection signals corresponding to a variation of capacitance between the plurality of first electrodes and the plurality of second electrodes caused by a deformation of the elastic member, and to calculates a position and an intensity of the touch therefrom.

A touch-screen display includes a display panel. A plurality of first electrodes is disposed on the display panel. An elastic member extends over the plurality of first electrodes. A plurality of second electrodes is disposed over the elastic member, and corresponds to the plurality of first electrodes so as to form a plurality of electrode pairs including a first electrode of the plurality of first electrodes and a corresponding second electrode of the plurality of second electrodes. A transparent conductive layer is disposed over the plurality of second electrodes. A touch sensor controller is configured to monitor a capacitance between the first electrode and the second electrode of each electrode pair of the plurality of electrode pairs.

BRIEF DESCRIPTION OF THE DRAWINGS

A more complete appreciation of the present disclosure and many of the attendant aspects thereof will be readily obtained aa the same becomes better understood by reference to the following detailed description when considered in connection with the accompanying drawings, wherein.

DETAILED DESCRIPTION OF THE INVENTION

Figure 1:
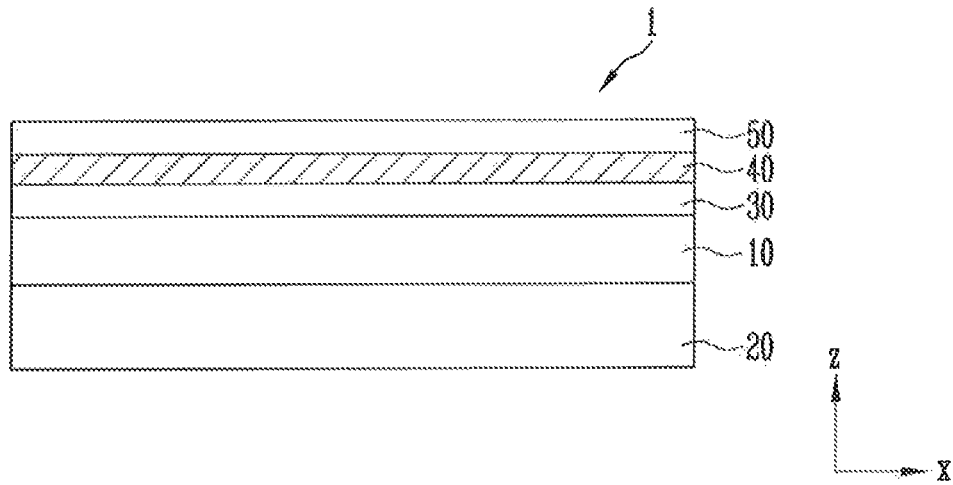
FIG. 1 is a cross-sectional view illustrating a display device according to an exemplary embodiment of the present disclosure.

In describing exemplary embodiments of the present disclosure illustrated in the drawings, specific terminology is employed for the sake of clarity. However, the present disclosure is not intended to be limited to the specific terminology so selected, and it is to be understood that each specific element includes all technical equivalents which operate in a similar manner.

In the drawings, dimensions may be exaggerated for clarity of illustration. It will be understood that when an element is referred to as being "on" another element, the element may be directly "on" the other element or intervening elements may be present. Like reference numerals may refer to like elements throughout the disclosure and figures.

Hereinafter, a touch sensor according to an exemplary embodiment of the present disclosure, and a display device including the same, will be described with reference to the drawings.

FIG. 1 is a cross-sectional view illustrating a display device according to an exemplary embodiment of the present disclosure.

Referring to FIG. 1, a display device 1, according to an exemplary embodiment of the present disclosure, may include a display panel 20, a touch sensor 10, and a conductive layer 40.

The display panel 20 may display an image, and may be disposed under the touch sensor 10.

The touch sensor 10 may be disposed on the display panel 20, and may calculate a position and an intensity of a touch input to the display device 1. For example, the touch sensor 10 may detect a pressure of the touch and calculate a position and an intensity of the touch.

The conductive layer 40, according to an exemplary embodiment of the present invention, may be disposed on the touch sensor 10, and may include a conductive material. For example, the conductive layer 40 is disposed on the display panel 20, so that in order to increase visibility of the image displayed by the display panel 20, the conductive layer 40 may be formed of a transparent conductive material.

The transparent conductive material may include a silver nano wire (AgNW), an Indium Tin Oxide (ITO), an Indium Zinc Oxide (IZO), an Antimony Zinc Oxide (AZO), an Indium Tin Zinc Oxide (ITZO), a Zinc Oxide (ZnC), a Tin Oxide ($SnO_2$), a carbon nano tube, graphene, a conductive polymer material (for example, Poly(3,4-ethylenedioxythiophene) (PEDOT), and/or the like.

Further, the metal may include gold (Au), silver (Ag), aluminum (Al), molybdenum (Mo), chromium (Cr), titanium (Ti), nickel (Ni), neodymium (Nd), copper (Cu), platinum (Pt), or the like. The conductive layer 40 may be formed as a single layer or as a multi-layer.

The display device 1, according to an exemplary embodiment of the present disclosure, may further include a window 50 disposed over both the display panel 20 and the touch sensor 10.

A polarizing plate 30 may be disposed at a lower side of the window 50, and the conductive layer 40 may be disposed between the window 50 and the polarizing plate 30. However, the polarizing plate 30 may optimally be omitted.

Further, FIG. 1 illustrates that the conductive layer 40 is disposed on the polarizing plate 30, but the present disclosure is not limited thereto. The conductive layer 40 may also be disposed between the touch sensor 10 and the polarizing plate 30.

Although not illustrated in FIG. 1, the display device, according to an exemplary embodiment of the present disclosure, may further include a bracket for accommodating the touch panel 20, the touch sensor 10, the polarizing plate 30, and the conductive layer 40. The window 50 may be coupled to the bracket through an attachment member.

When the display device 1, according to an exemplary embodiment of the present disclosure, is flexible, stretchable, foldable, bendable, or rollable, a passivation layer may be disposed under the display panel 20.

Further, when the display device 1 is flexible, stretchable, foldable, bendable, or rollable, an attachment layer may be disposed between the respective members (for example, the touch panel, the touch sensor, the polarizing plate, and the window) forming the display device 1 to enable the respective members to be coupled with each other.

Figure 2:
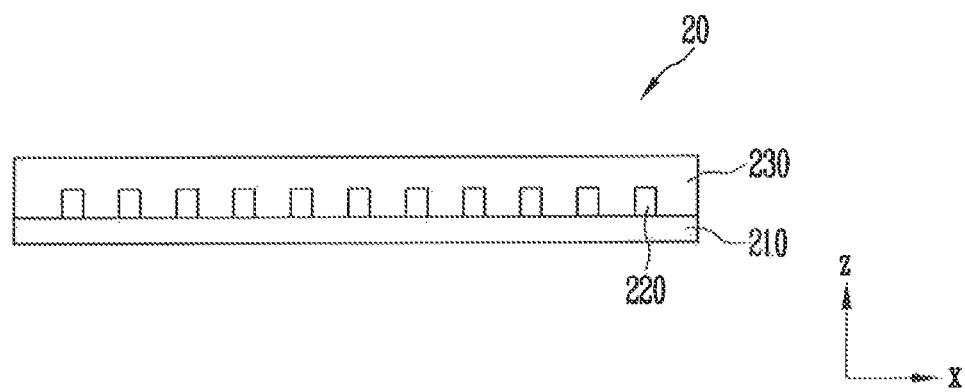
FIG. 2 is a diagram illustrating a display panel according to an exemplary embodiment of the present disclosure.

FIG. 2 is a diagram illustrating the display panel according to an exemplary embodiment of the present disclosure.

Referring to FIG. 2, the display panel 20, according to an exemplary embodiment of the present disclosure, may include a substrate 210, pixels 220, and an encapsulation layer 230.

A plurality of pixels 220 may be disposed on the substrate 210. Further, the encapsulation layer 230 may be disposed on the pixels 220 and the substrate 210.

For example, the substrate 210 may be formed of an insulating material, such as glass and resin. Further, the substrate 210 may be formed of a flexible material so as to be bendable or foldable, and may have a single-layer structure or a multi-layer structure.

For example, the substrate 210 may include polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and/or cellulose acetate propionate.

However, the material of the substrate 210 may be variously changed, and may be formed of Fiber Glass Reinforced Plastic (FRP), and the like.

The pixels 220 may emit light under the control of a display driver, and may be protected from contamination by the encapsulation layer 230.

For example, the encapsulation layer 230 may prevent moisture, oxygen, and the like from permeating into the pixels 220.

In this case, the encapsulation layer 230 may include glass, an organic material, and/or an inorganic material, and may have a single-layer structure or a multi-layer structure.

For example, the encapsulation layer 230 may have a multi-layer structure including one or more organic layers and one or more inorganic layers.

The organic layer may include a fluoride-based carbon compound, such as polyacryl, polyimide, and Teflon, and an organic insulating material, such as poly epoxy and benzocyclobutene. The inorganic material may include polysiloxane, a silicon nitride, a silicon oxide, and/or an inorganic insulating material including an aluminum oxide.

Figure 3:
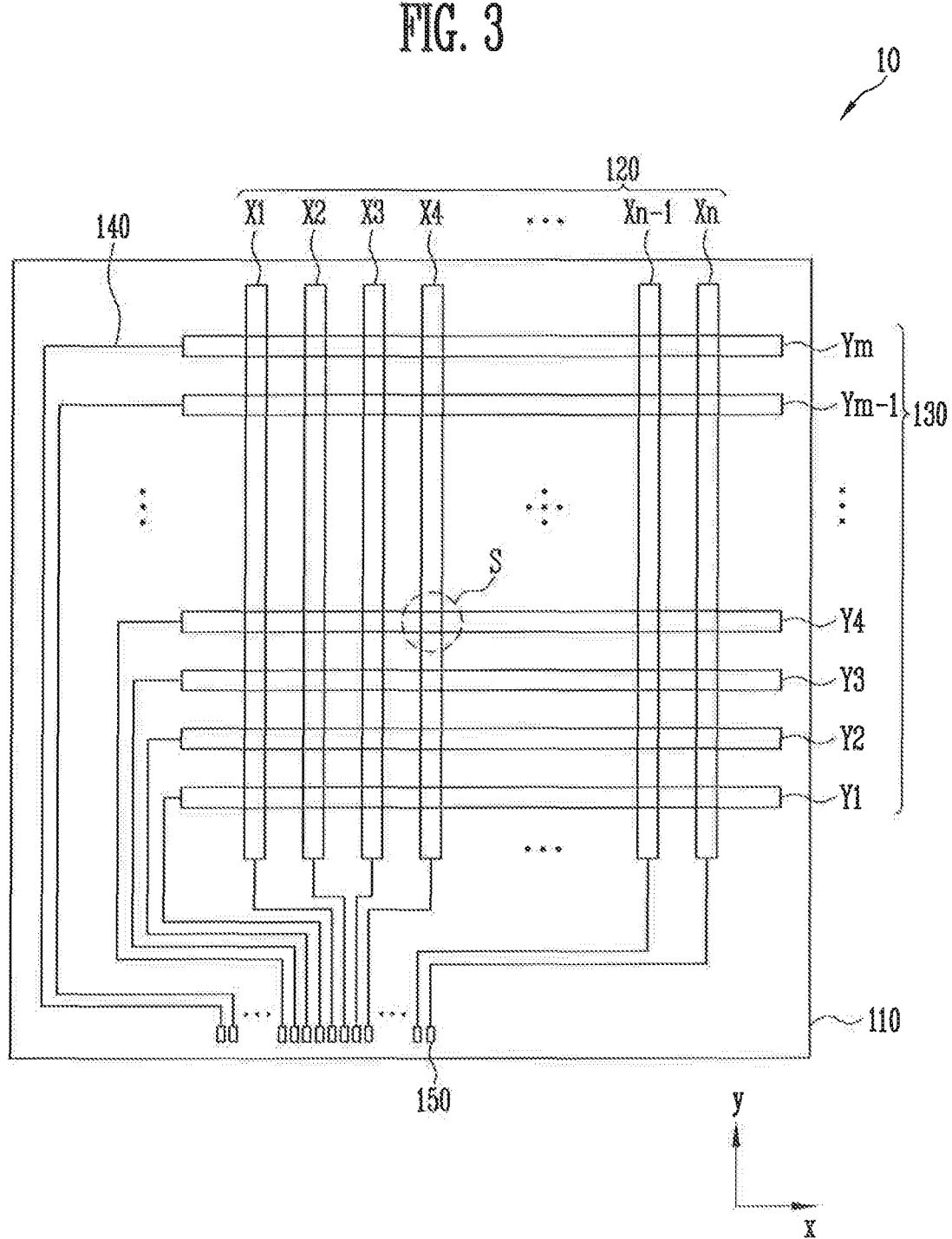
FIG. 3 is a top plan view illustrating a touch sensor according to an exemplary embodiment of the present disclosure.

FIG. 3 is a top plan view illustrating a touch sensor according to an exemplary embodiment of the present disclosure.

Referring to FIG. 3, the touch sensor 10, according to an exemplary embodiment of the present disclosure, may include a substrate 110, first electrodes 120, and second electrodes 130. The first electrodes 120 and second electrodes 120 may be disposed on the substrate 110.

The first electrodes 120 and the second electrodes 130 may include a conductive material.

For example, the touch sensor 10, according to an exemplary embodiment of the present disclosure, is disposed on the display panel 20. Accordingly, visibility of an image displayed by the display panel 20 may be increased by forming the first electrodes 120 and the second electrodes 130 of a transparent conductive material.

The transparent conductive material may include a silver nano wire (AgNW), an Indium Tin Oxide (ITO), an Indium Zinc Oxide (IZO), an Antimony Zinc Oxide (AZO), an Indium Tin Zinc Oxide (ITZO), a Zinc Oxide (ZnC), a Tin Oxide ($SnO_2$), a carbon nano tube, graphene, a conductive polymer material (for example, Poly(3,4-ethylenedioxythiophene) (PEDOT), and/or the like.

Further, the metal may include gold (Au), silver (Ag), aluminum (Al), molybdenum (Mo), chromium (Cr), titanium (Ti), nickel (Ni), neodymium (Nd), copper (Cu), platinum (Pt), and/or the like. The first and second electrodes 120 and 130 may be formed in a single layer or multiple layers.

Elastic members may be disposed between the first electrodes 120 and the second electrodes 130. The elastic member may include a material having an insulating property.

The first electrodes 120 may include n electrodes X1 to Xn, which are sequentially arranged in an x-axis direction, and the second electrodes 130 may include an electrodes Y1 to Ym, which are sequentially arranged in a y-axis direction vertical to the x-axis direction. Herein, n and m are each integers greater than or equal to 2.

Driving signals may be applied to the first electrodes 120 and the second electrodes 130, and the driving signals applied to the second electrodes 130 may be sequentially applied so as not to overlap one another.

A sensor controller may obtain detection signals corresponding to a capacitance variation from the first electrodes 120, and calculate a position and an intensity of a touch by referring to the detection signals.

The substrate 110 may be formed of an insulating material, such as glass or resin. Further, the substrate 110 may be formed of a flexible material so as to be bendable or foldable, and may have a single-layer structure or a multi-layer structure.

For example, the substrate 110 may include polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and/or cellulose acetate propionate.

However, the material of the substrate 110 may be variously changed, and may e formed of Fiber Glass Reinforced Plastic (FRP), and the like.

The substrate 110 may be formed of a separate substrate, or various constituent elements included in the display device 1. For example, the substrate 110 may be an encapsulation substrate or an encapsulation layer used in the display device 1.

Wires 140 may connect the first and second electrodes 120 and 130 with pads 150. Further, the wires 140 may be connected to a sensor controller through the pads 150.

When a touch is input into the display device 1, capacitance between the first and second electrodes 120 and 130 is changed, so that the sensor controller may detect a pressure of the touch by using signals an output from the first electrodes 120. The magnitude of the change in capacitance may be proportional to the pressure of the touch.

For example, the sensor controller may calculate the intensity of a touch by referring to a size of the capacitance variation.

Further, the first electrodes 120 and the second electrodes 130, according to an exemplary embodiment of the present disclosure, are disposed in a matrix shape, so that the sensor controller may also calculate a position of the touch, as well as an intensity of a touch.

For example, in the case where the first electrodes 120 correspond to detecting electrodes and the second electrodes 130 correspond to driving electrodes, when a detection signal corresponding to the capacitance variation is output from the $i^{th}$ first electrode while a driving signal is applied to the $j^{th}$ second electrode, it may be determined that a touch is input to a position, at which the $i^{th}$ first electrode and the $j^{th}$ second electrode overlap.

Figure 4:
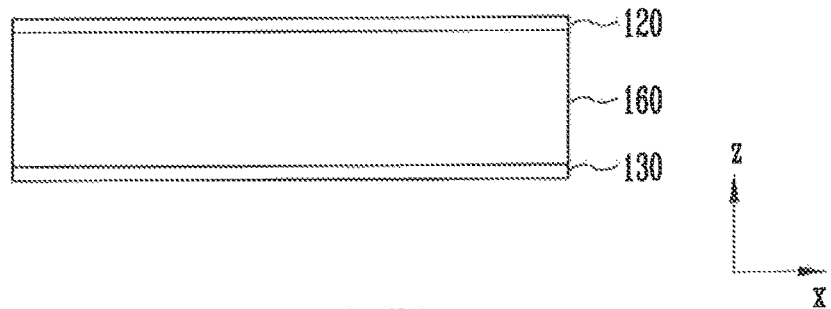
FIG. 4 is a cross-sectional view of region A illustrated in FIG. 3.

FIG. 4 is a cross-sectional view of region A illustrated in FIG. 3.

Referring to FIGS. 3 and 4, the touch sensor 10, according to an exemplary embodiment of the present disclosure, may further include an elastic member 160 disposed between the first electrode 120 and the second electrode 130.

The first electrode 120 and the second electrode 130 may be spaced apart from each other. In this case, the first electrode 120 and the second electrode 130 may serve as capacitors, and capacitance may be formed between the first electrode 120 and the second electrode 130.

The capacitance between the first electrode 120 and the second electrode 130 may be varied according to a distance between the first electrode 120 and the second electrode 130.

For example, when a touch is input and predetermined power is applied onto the touch sensor 10, a distance between the first electrode 120 and the second electrode 130 positioned at a place corresponding to the touch is changed, and thus, capacitance may be changed.

Accordingly, it is possible to recognize a pressure of the touch by detecting the capacitance variation when the touch is generated.

The elastic member 160 may be disposed between the first electrode 120 and the second electrode 130.

For example, one surface of the elastic member 160 may be in contact with the first electrode 120, and the opposite surface of the elastic member 160 may be in contact with the second electrode 130.

The elastic member 160 may be entirely disposed between the first electrode 120 and the second electrode 130. In order to increase visibility of the image displayed on the display panel 20, the elastic member 160 may also be limited to a crossing portion of the first electrode 120 and the second electrode 130. The elastic member 160 may also be formed in a mesh form so as not to overlap the pixels 220 of the display panel 20.

The elastic member 160 may serve to relieve impact from the outside, and to this end, the elastic member 160 may have elastic force. For example, the elastic member 160 may be deformed by pressure from the outside, and may have elastic force, by which the elastic member 130 is restorable to an original state when the pressure from the outside is removed.

Further, the elastic member 160 may have an insulating property to prevent the first electrode 120 and the second electrode 130 from electrically contacting each other.

The touch sensor 10, according to an exemplary embodiment of the present disclosure, is disposed on the display panel 20, so that in order to increase visibility of an image displayed by the display panel 20, the elastic member 160 may be formed of a transparent conductive material.

The elastic member 160 may be provided with a porous polymer so as to have elastic force. For example, the elastic member 160 may be provided in a form of a foam body, such as a sponge.

For example, the elastic member 160 may include thermoplastic elastomer, polystyrene, polyolefin, polyurethane thermoplastic elastomers, polyamides, synthetic rubbers, polydimethylsiloxane, polybutadiene, polyisobutylene, [poly(styrene-butadienestyrene)], polyurethanes, polychloroprene, polyethylene, silicone, and/or a combination thereof, but the elastic member 160 may alternatively be formed of anther material.

Further, the elastic member 160 may also be provided in a form of an Optically Clear Adhesive (OCA), an Optically Clear Resin (OCR), and a Pressure Sensitive Adhesive (PSA).

According to an exemplary embodiment of the present disclosure, it is possible to provide the display device 1 having high touch sensitivity by positioning the display panel 20 under the display device 1 and positioning the touch sensor 10 on the display panel 20. Further, the elements (for example, the first electrodes, the second electrodes, and the elastic member) of the touch sensor 10 may be formed of a transparent material, so that it is possible to prevent visibility of the display device 1 from being degraded by the touch sensor 10 disposed on the display panel 20.

Figure 5A:
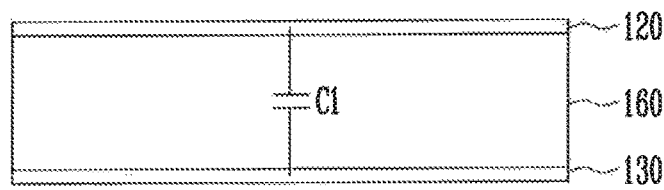
FIGS. 5A to 5C are diagrams illustrating an operation of the touch sensor illustrated in FIGS. 3 and 4 in accordance with exemplary embodiments of the present invention.
Figure 5B:
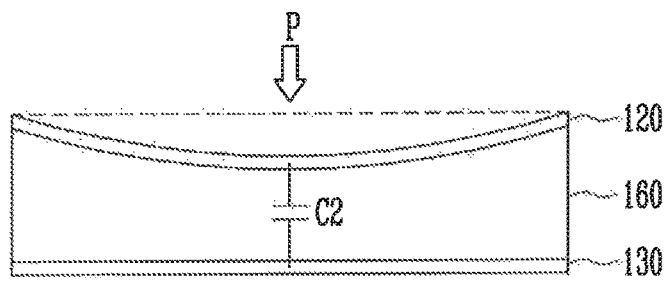
Figure 5C:
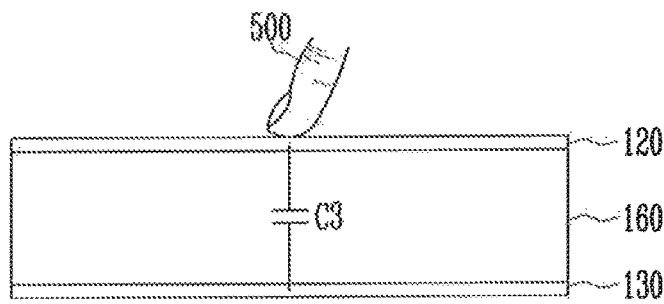

FIGS. 5A to 5C are diagrams illustrating an operation of the touch sensor illustrated in FIGS. 3 and 4. FIG. 5A illustrates a state where a pressure P is not applied to the touch sensor 10, and FIG. 5B illustrates a state where a pressure P is applied to the touch sensor 10. Further, FIG. 5C illustrates a state where a finger of a user is in contact with the touch sensor, without significant pressure bring applied.

Referring to FIG. 5A, when the pressure P is not applied to the touch sensor 10, first capacitance C1 may be formed between the first electrode 120 and the second electrode 130.

Referring to FIG. 5B, when the pressure P is applied to the touch sensor 100, according to a touch of a user or the like, a distance between the first electrode 120 and the second electrode 130 may be changed, and thus, the capacitance between the first electrode 120 and the second electrode 130 may be changed.

For example, when a distance between the first electrode 120 and the second electrode 130 is changed by the applied pressure P, the first capacitance C1 may be changed to second capacitance C2.

Finally, the distance between the first electrode 120 and the second electrode 130 is decreased when the external pressure P is increased, and the capacitance between the first electrode 120 and the second electrode 130 may also be increased.

Accordingly, it is possible to detect an intensity of the pressure P or the like by monitoring a variation of the capacitance generated in the touch sensor 10.

The pressure P applied to the touch sensor 10 may be mainly generated by a touch of a user, but is not limited thereto, and the pressure P applied to the touch sensor 10 may be generated by various other reasons.

Referring to FIG. 5C, when a conductive touch tool 500, such as a finger of a user or a stylus, is in contact with or is close to the touch sensor 10, the touch tool 500 draws out and absorbs charges from the second electrode 130 adjacent to the touch position, so that the capacitance between the first electrode 120 and the second electrode 130 may be decreased.

Accordingly, when the conductive touch tool 500 is in contact with or close to the touch sensor 10, the capacitance C1 may be changed to a third capacitance C3. For example, even though the shape of the elastic member 160 is not transformed, the capacitance between the first electrode 120 and the second electrode 130 may be changed.

The touch sensor 10, according to an exemplary embodiment of the present disclosure, is disposed on the display device 1, thereby being influenced by the touch tool 500.

For example, when a touch is input to the touch sensor 10, according to an exemplary embodiment of the present disclosure, through the touch tool 500, both a variation of capacitance by the transformation of the elastic member 160 and a variation of capacitance according to the absorption of the charges by the touch tool 500 may be detected.

It may be assumed that a variation (C2−C1) of capacitance caused by the transformation of the elastic member 160 is a first capacitance variation and a variation (C3−C1) of capacitance caused by the absorption of the charges by the touch tool 500 is a second capacitance variation. The first capacitance variation may have a positive value and the second capacitance variation may have a negative value.

Accordingly, even though the first capacitance variation (C2−C1) may be obtained as a detection signal for the touch, a value obtained by subtracting the second capacitance variation (C3−C1) from the first capacitance variation (C2−C1) may be obtained as a detection signal.

This may cause an error of the recognition of the touch, and in order to prevent the error, the touch tool 500 may be prevented from absorbing the charges from the second electrode 130.

To this end, the conductive layer 40 may be formed on the touch sensor 10 according to an exemplary embodiment of the present disclosure. For example, the conductive layer 40 may be disposed between a surface (for example, one surface of the window 50) of the display device, which is in contact with the touch tool 50, and the touch sensor 10, and perform a function of preventing the touch tool 500 from absorbing the charges from the second electrodes 130.

In this case, a ground voltage may be applied to the conductive layer 40.

Alternatively, the conductive layer 40 may be in a floating state. For example, a specific voltage is not applied to the conductive layer 40.

Further, resistance per unit area of the conductive layer 40 may have a low resistance value, and for example, surface resistance of the conductive layer 40 may be 1,000Ω/□ or less.

Figure 6:
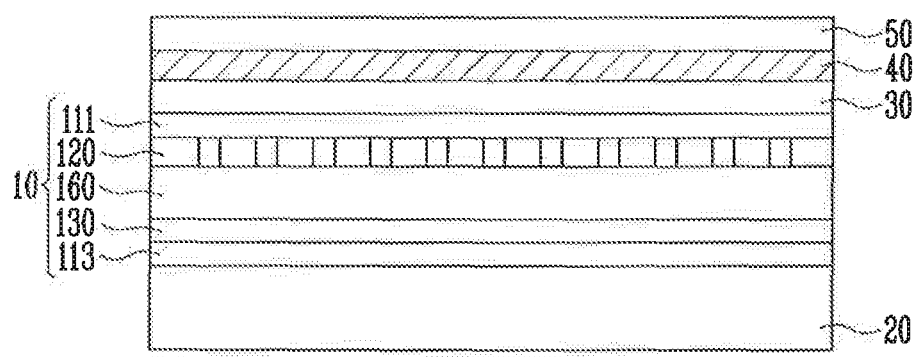
FIG. 6 is a diagram illustrating the display device illustrated in FIG. 1 in more detail.

FIG. 6 is a diagram illustrating the display device illustrated in FIG. 1 in more detail. For example, FIG. 6 illustrates the touch sensor 10 among the elements of the display device 1 illustrated in FIG. 1.

Referring to FIG. 6, the first electrodes 120 of the touch sensor 10 may be disposed on the second electrode 130.

In the display device, which is capable of detecting a touch, when the detecting electrode of the touch sensor is disposed adjacent to the display panel, there may be a problem in that a Signal to Noise Ratio (SNR) of the touch sensor is decreased by noise of the display panel.

In the display device 1, according to an exemplary embodiment of the present disclosure, the display panel 20 is disposed under the touch sensor 10, so that it is possible to minimize an influence by the noise of the display panel 20 by positioning the second electrodes 130 at a lower side and positioning the first electrodes 120, operated as the detecting electrodes, at an upper side.

Referring to FIG. 6, the first electrodes 120 may be formed on a first substrate 111, the second electrodes 130 may be formed on a second substrate 113, and the first substrate 111 and the second substrate 113 may be coupled to each other with the elastic member 160 interposed therebetween. However, either the first substrate 111 or the second substrate 113 (or both) may be omitted.

The first substrate 111 or the second substrate 113 may be formed of the same material as that of the substrate 110 illustrated in FIG. 3.

The configuration of the display device illustrated in FIG. 6 may be similar to and may perform the same functions as those of the exemplary embodiment described above with reference to FIGS. 1 to 4.

Figure 7:
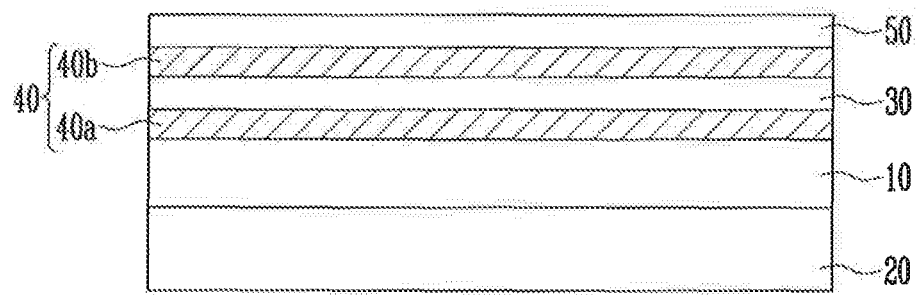
FIG. 7 is a cross-sectional view schematically illustrating a display device according to an exemplary embodiment of the present disclosure.

FIG. 7 is a cross-sectional view schematically illustrating a display device according to an exemplary embodiment of the present disclosure.

Referring to FIG. 7, a display device, according to an exemplary embodiment of the present disclosure, may include a plurality of conductive layers 40.

The plurality of conductive layers 40 is disposed on a touch sensor 10, and the plurality of conductive layers 40 may be disposed on different layers.

For example, any one conductive layer 40a may be disposed between the touch sensor 10 and a polarizing plate 30, and the other conductive layer 40b may be disposed between the polarizing plate 30 and a window 50.

As illustrated in FIG. 7, when the plurality of conductive layers 40 is provided, a touch tool 500 more completely blocks the charges from the second electrodes 130 from being absorbed, thereby further decreasing an error of the recognition of a touch.

FIG. 7 illustrates two conductive layers 40 (40a and 40b), but the present disclosure is not limited thereto, and the number of conductive layers 40 may be variously changed.

FIG. 8A to 8D are top plan views illustrating the conductive layer illustrated in FIG. 1.

Figure 8A:
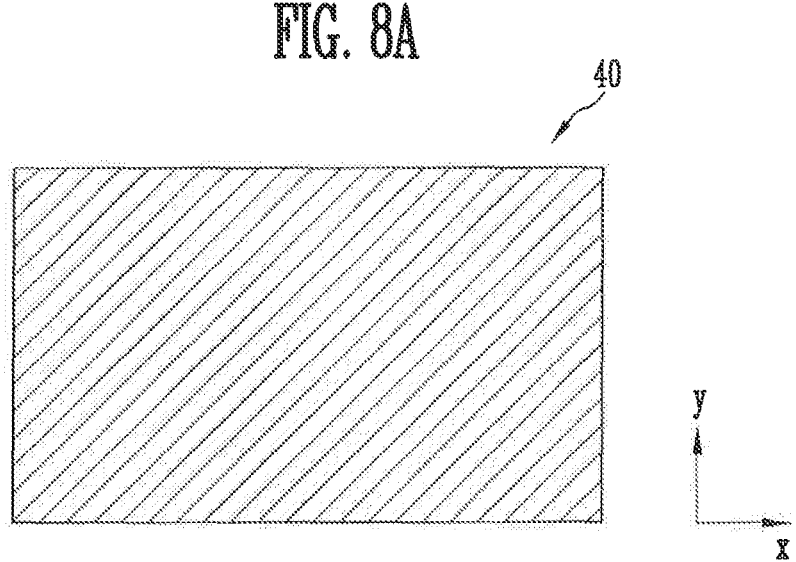
FIGS. 8A to 8D are top plan views illustrating a conductive layer illustrated in FIG. 1.

Referring to FIG. 8A, the conductive layer 40, according to an exemplary embodiment of the present invention, may have a plate shape having no opening portions and/or no patterns.

Figure 8B:
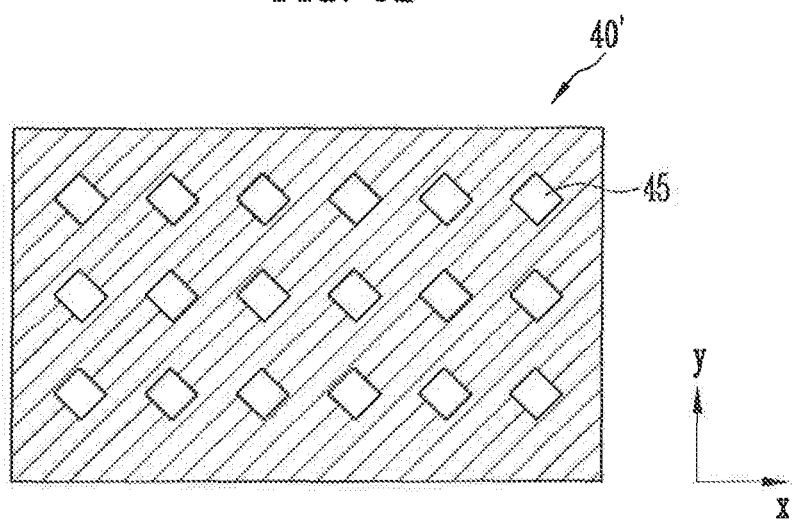
Figure 8C:
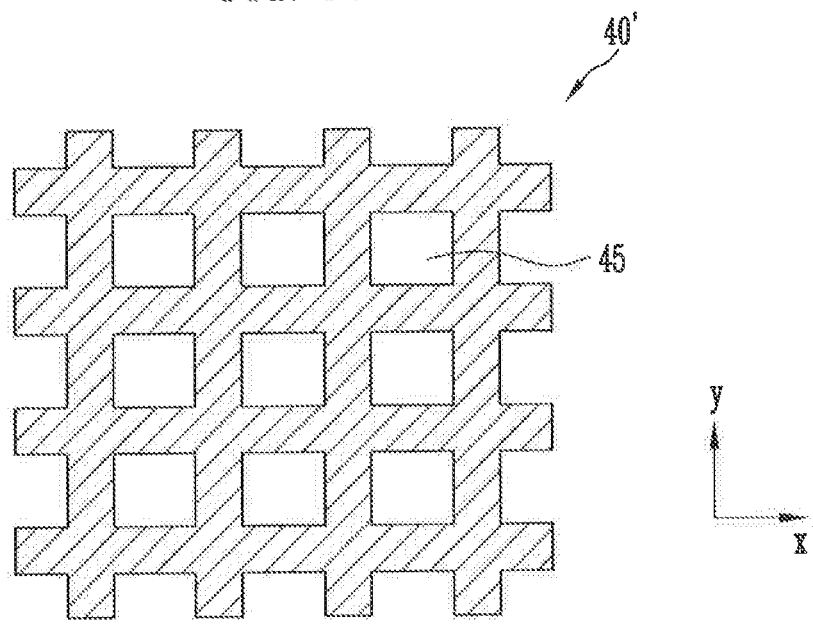

Further, referring to FIGS. 8B and 8C, a conductive layer 40', according to an exemplary embodiment of the present disclosure, may include a pattern 45, and the pattern 45 may be an opening having a predetermined shape.

The pattern 45 may have a rhomboid shape as illustrated in FIG. 8B.

Otherwise, the pattern 45 may be formed in a mesh form so that the conductive layer 40' overlaps the first electrodes 120 and the second electrodes 130. For example, as illustrated in FIG. 8C, the quadrangular patterns 45 may be aligned in a horizontal direction and a vertical direction. In this case, the number of columns and rows, with which the patterns 45 are formed, may correspond to the number of first electrodes 120 and second electrodes 130.

Figure 8D:
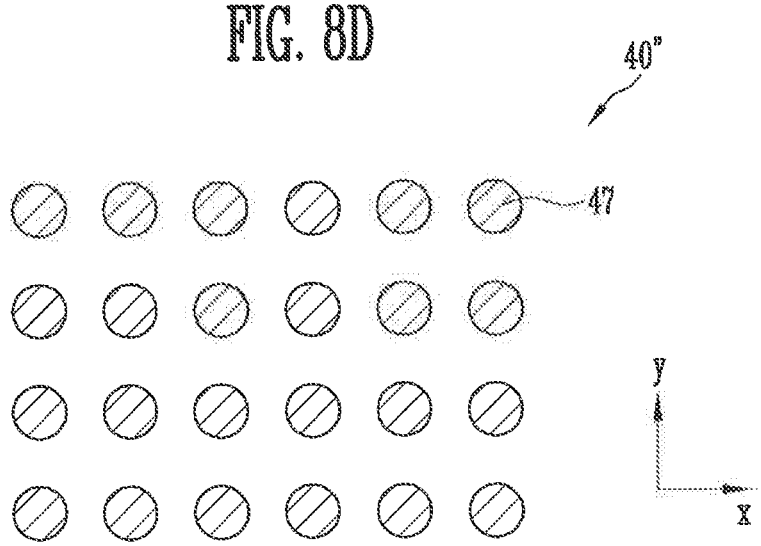

The shape of the pattern 45 is not limited to the shapes illustrated in FIGS. 8B and 8C, and the shape of the pattern 45 may be variously changed. Referring to FIG. 8D, a conductive layer 40" may include patterns 47, and the patterns 47 may overlap the crossing regions of the first electrodes 120 and the second electrodes 130. In this case, an area of the pattern 47 may be formed to be larger than the crossing region of the first electrode 120 and the second electrode 130.

The number of patterns 47 is not limited to the illustration of FIG. 8D, and may be variously changed in accordance with the number of first electrodes 120 and second electrodes 130.

FIG. 8D illustrates that the patterns 47 are separated from one another, but the present disclosure is not limited thereto, and the patterns 47 may also be connected to one another.

When the conductive layers 40, 40', and 40" are formed as illustrated in FIGS. 8B to 8D, visibility of an image displayed on the display panel 20 may be increased.

It is described above that the touch sensor 10 and the conductive layer 40 are separately configured, however, the conductive layer 40 may be included in the touch sensor 10.

Figure 9:
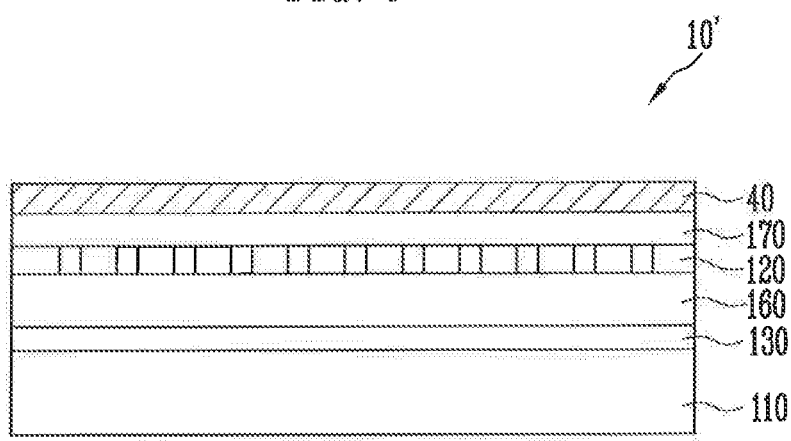
FIG. 9 is a cross-sectional view schematically illustrating a touch sensor according to an exemplary embodiment of the present disclosure.

FIG. 9 is a cross-sectional view schematically illustrating the touch sensor according to an exemplary embodiment of the present disclosure.

Referring to FIG. 9, the touch sensor 10', according to an exemplary embodiment of the present disclosure, may include a substrate 110, first and second electrodes 120 and 130, an elastic member 160, and a conductive layer 40.

The first and second electrodes 120 and 130 may be disposed on the substrate 110, and the elastic member 160 may be disposed between the first electrodes 120 and the second electrodes 130. When a touch is input to the touch sensor 10', it is possible to calculate a position and an intensity of the touch by measuring an extent to which the capacitance between the first electrodes 120 and the second electrodes 130 change.

The substrate 110, the first electrodes 120, the second electrodes 130, and the elastic member 160 may be substantially the same as the substrates 110, the first electrodes 120, the second electrodes 130, and the elastic member 160 illustrated in FIGS. 3 and 4 and described above. The first electrodes 120 may be detection electrodes outputting detection signals corresponding to a capacitance variation.

An insulating layer 170 may be disposed on the first electrodes 120. The insulating layer 170 may be substantially the same as the substrate 110. Alternatively, the insulating layer 170 may be an encapsulation layer protecting the first electrodes 120. The encapsulation layer may be substantially the same as the encapsulation layer 230 illustrated in FIG. 2 among the aforementioned exemplary embodiments.

A conductive layer 40 may be disposed on the insulating layer 170. That is, the first electrode 120 may be disposed between the second electrode 130 and the conductive layer 40.

The conductive layer 40 may perform a function of preventing charges from the second electrodes 130 from being absorbed by a touch tool when a touch by the touch tool is input to the touch sensor 10'. For example, the conductive layer 40 may be substantially the same as the conductive layer illustrated in FIGS. 1, 6, and 7 and described above.

Although the present invention has been described with reference to exemplary embodiments thereof, those skilled in the art may understand that the present invention may be variously modified and changed within a scope without departing from the spirit and the area of the present invention.

What is claimed is:

1. A display device, comprising:
a display panel;
a touch sensor disposed on the display panel, and configured to detect a pressure of a touch and calculate a position and an intensity of the touch;
a polarizing plate disposed on the touch sensor;
a window disposed on the polarizing plate;
a first conductive layer disposed between the touch sensor and the polarizing plate; and
a second conductive layer disposed between the polarizing plate and the window, wherein the touch sensor includes:
a plurality of first electrodes;
a plurality of second electrodes spaced apart from the plurality of first electrodes, the plurality of second electrodes corresponding to the plurality of first electrodes so as to form a plurality of electrode pairs including a first electrode of the plurality of first electrodes and a corresponding second electrode of the plurality of second electrodes; and
at least one elastic member disposed between the plurality of first electrodes and the plurality of second electrodes,
wherein the display device is configured to calculate a variation of a capacitance between the plurality of first electrodes and the plurality of second electrodes that is caused by a transformation of the at least one elastic member in response to the pressure of the touch, and
wherein the at least one elastic member comprises a plurality of elastic members, each of which is disposed between the first and second electrodes of each electrode pair of the plurality of electrode pairs.

2. The display device of claim 1, wherein the plurality of second electrodes is disposed between the plurality of first electrodes and the display panel.

3. The display device of claim 1, wherein the plurality of first electrodes and the plurality of second electrodes each include a transparent conductive material.

4. The display device of claim 1, wherein the at least one elastic member includes a transparent insulating material.

5. The display device of claim 1, wherein a ground voltage is applied to the first and second conductive layers.

6. The display device of claim 1, wherein the first and second conductive layers are in a floating state.

7. The display device of claim 1, wherein the first and second conductive layers include a transparent conductive material.

8. The display device of claim 1, wherein a surface resistance of the first and second conductive layers is less than or equal to $1,000\Omega/\square$.

9. A touch sensor, comprising:
a plurality of first electrodes;
a plurality of second electrodes spaced apart from the plurality of first electrodes, the plurality of second electrodes corresponding to the plurality of first electrodes so as to form a plurality of electrode pairs including a first electrode of the plurality of first electrodes and a corresponding second electrode of the plurality of second electrodes;
at least one elastic member disposed between the plurality of first electrodes and the plurality of second electrodes, each of the at least one elastic member being configured to deform in response to a pressure of a touch; and
a conductive layer disposed on the plurality of first electrodes, wherein the touch sensor is configured to obtain detection signals corresponding to a variation of capacitance between the plurality of first electrodes and the plurality of second electrodes caused by a deformation of the at least one elastic member, and to calculates a position and an intensity of the touch therefrom,
wherein the conductive layer includes a pattern of openings of a predetermined shape, and
wherein the at least one elastic member comprises a plurality of elastic members, each of which is disposed between the first and second electrodes of each electrode pair of the plurality of electrode pairs.

10. The touch sensor of claim 9, wherein the plurality of first electrodes and the plurality of second electrodes each include a transparent conductive material.

11. The touch sensor of claim 9, wherein the at least one elastic member includes a transparent insulating material.

12. The touch sensor of claim 9, wherein the detection signals are output from the plurality of first electrodes.

13. The touch sensor of claim 9, wherein the conductive layer includes a transparent conductive material.

14. The touch sensor of claim 9, wherein the plurality of first electrodes are disposed between the plurality of second electrodes and the conductive layer.

15. The touch sensor of claim 9, wherein a ground voltage is applied to the conductive layer.

16. The touch sensor of claim 9, wherein the conductive layer is in a floating state.

17. The touch sensor of claim 9, wherein when the touch is applied to the touch sensor by a conductive touch tool, the conductive layer blocks charge from moving from the plurality of second electrodes to the conductive touch tool.

18. A touch-screen display, comprising:
a display panel;
a plurality of first electrodes disposed on the display panel;
at least one elastic member extending over the plurality of first electrodes;
a plurality of second electrodes, disposed over the elastic member, corresponding to the plurality of first electrodes so as to form a plurality of electrode pairs including a first electrode of the plurality of first electrodes and a corresponding second electrode of the plurality of second electrodes;
a polarizing plate disposed on the plurality of second electrodes;
a transparent conductive layer disposed over the polarizing plate; and
a touch sensor controller configured to monitor a capacitance between the first electrode and the second electrode of each electrode pair of the plurality of electrode pairs,
wherein the at least one elastic member comprises a plurality of elastic members, each of which is disposed between the first and second electrodes of each electrode pair of the plurality of electrode pairs.

19. The touch-screen display of claim 18, wherein the touch sensor controller is further configured to determine a position and pressure of a touch based on a change in the monitored capacitance.

* * * * *